(12) United States Patent
Rowlands et al.

(10) Patent No.: US 11,698,441 B2
(45) Date of Patent: Jul. 11, 2023

(54) TIME OF FLIGHT-BASED THREE-DIMENSIONAL SENSING SYSTEM

(71) Applicant: VIAVI Solutions Inc., San Jose, CA (US)

(72) Inventors: Scott Rowlands, Santa Rosa, CA (US); Markus Bilger, Santa Rosa, CA (US); William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 506 days.

(21) Appl. No.: 16/820,252

(22) Filed: Mar. 16, 2020

(65) Prior Publication Data

US 2020/0300977 A1   Sep. 24, 2020

Related U.S. Application Data

(60) Provisional application No. 62/829,249, filed on Apr. 4, 2019, provisional application No. 62/822,603, filed on Mar. 22, 2019.

(51) Int. Cl.
*G01S 7/48* (2006.01)
*G01S 7/481* (2006.01)
*G01S 17/894* (2020.01)

(52) U.S. Cl.
CPC .......... *G01S 7/4814* (2013.01); *G01S 17/894* (2020.01)

(58) Field of Classification Search
None
See application file for complete search history.

(56) References Cited

U.S. PATENT DOCUMENTS

| | | | |
|---|---|---|---|
| 9,285,477 B1 * | 3/2016 | Smith | G01S 7/4817 |
| 9,760,837 B1 * | 9/2017 | Nowozin | G01S 7/4808 |
| 9,825,425 B2 * | 11/2017 | Mor | H01S 5/02253 |
| 9,939,721 B2 * | 4/2018 | Kriman | G02B 19/0028 |
| 10,041,788 B2 * | 8/2018 | Pettersson | G01B 11/2545 |
| 10,444,331 B1 * | 10/2019 | Lee | G01S 17/08 |
| 2014/0346334 A1 * | 11/2014 | Grassinger | G01B 11/25 250/229 |
| 2015/0160340 A1 * | 6/2015 | Grauer | G01S 7/4802 356/5.04 |
| 2015/0163474 A1 * | 6/2015 | You | G01S 7/4814 348/46 |

(Continued)

FOREIGN PATENT DOCUMENTS

WO   2018126248 A1   7/2018

OTHER PUBLICATIONS

International search report and written opinion for Application No. PCT/US2020/023190, dated May 25, 2020, 11 pages.

*Primary Examiner* — Jefferey F Harold
*Assistant Examiner* — Timothy R Newlin
(74) *Attorney, Agent, or Firm* — Harrity & Harrity, LLP

(57) ABSTRACT

A light shaping optic may include a substrate. The light shaping optic may include a structure disposed on the substrate, wherein the structure is configured to receive one or more input beams of light with a uniform intensity field and less than a threshold total intensity, and wherein the structure is configured to shape the one or more input beams of light to form one or more output beams of light with a non-uniform intensity field and less than the threshold total intensity.

20 Claims, 12 Drawing Sheets

(56) References Cited

U.S. PATENT DOCUMENTS

| | | | |
|---|---|---|---|
| 2015/0253429 A1* | 9/2015 | Dorrington | G01S 17/894 356/5.01 |
| 2016/0146927 A1* | 5/2016 | Hudman | G01S 7/4814 359/558 |
| 2016/0327647 A1* | 11/2016 | Herbst | G01C 15/002 |
| 2017/0328990 A1* | 11/2017 | Magee | G01S 17/931 |
| 2017/0353004 A1* | 12/2017 | Chen | H01S 5/022 |
| 2018/0167602 A1 | 6/2018 | Pacala et al. | |
| 2018/0301875 A1* | 10/2018 | Burroughs | G01S 17/89 |
| 2018/0348361 A1* | 12/2018 | Turbide | G01S 13/9023 |
| 2019/0049097 A1* | 2/2019 | Rossi | F21V 14/06 |
| 2019/0204421 A1* | 7/2019 | Gurevich | B65D 90/48 |
| 2019/0219696 A1* | 7/2019 | Xu | G01S 7/4911 |
| 2020/0025923 A1* | 1/2020 | Eichenholz | G01S 17/10 |
| 2020/0150231 A1* | 5/2020 | Liu | H04B 10/503 |
| 2020/0264490 A1* | 8/2020 | Zhu | G01S 17/89 |
| 2020/0363514 A1* | 11/2020 | Kawazoe | G01S 17/10 |
| 2021/0033710 A1* | 2/2021 | Matsumoto | G01S 17/08 |
| 2021/0049252 A1* | 2/2021 | Ando | G01S 17/18 |
| 2021/0072379 A1* | 3/2021 | Christmas | G03H 1/2294 |
| 2021/0147077 A1* | 5/2021 | Raabe | G01S 17/89 |
| 2021/0225090 A1* | 7/2021 | Tang | G06T 19/00 |
| 2021/0231812 A1* | 7/2021 | Gil-Cacho | G01S 7/493 |
| 2021/0398292 A1* | 12/2021 | Yoshida | G06K 9/6284 |

* cited by examiner

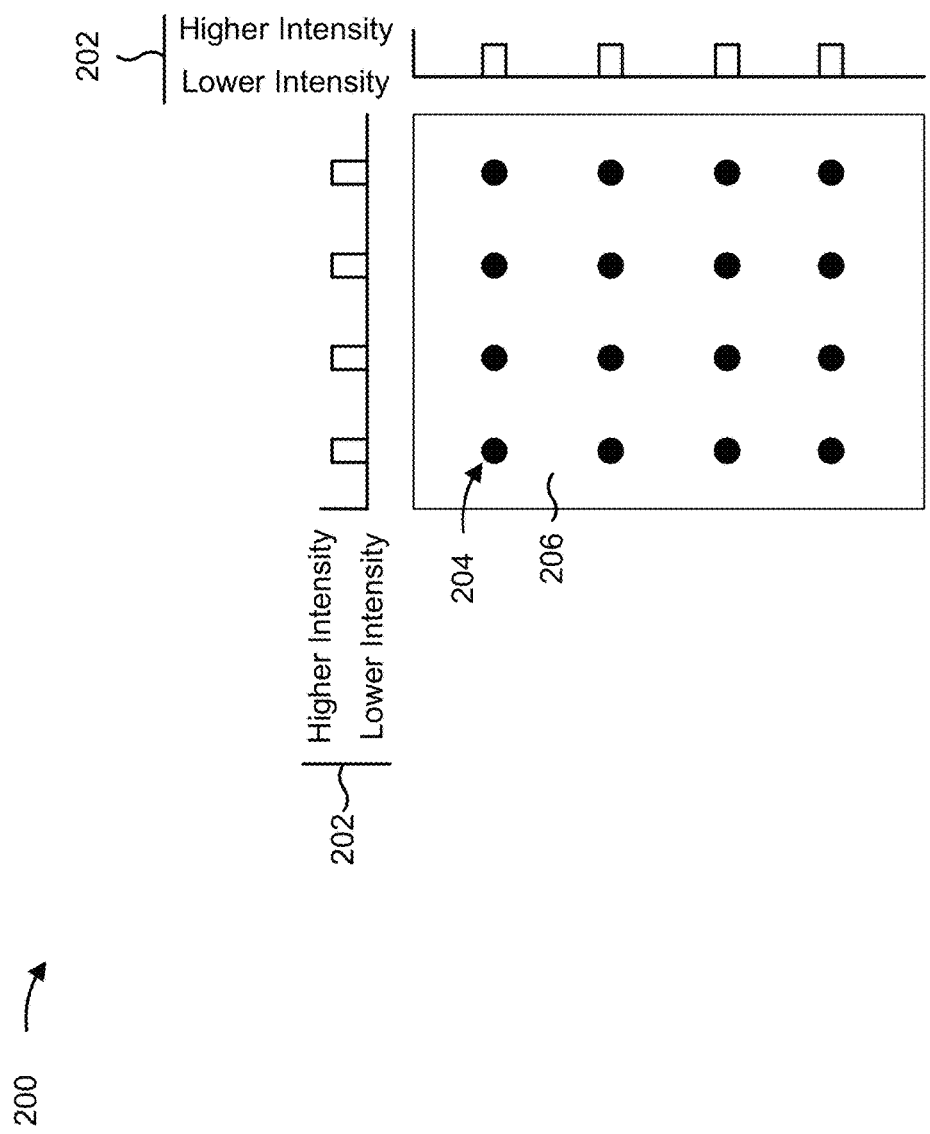

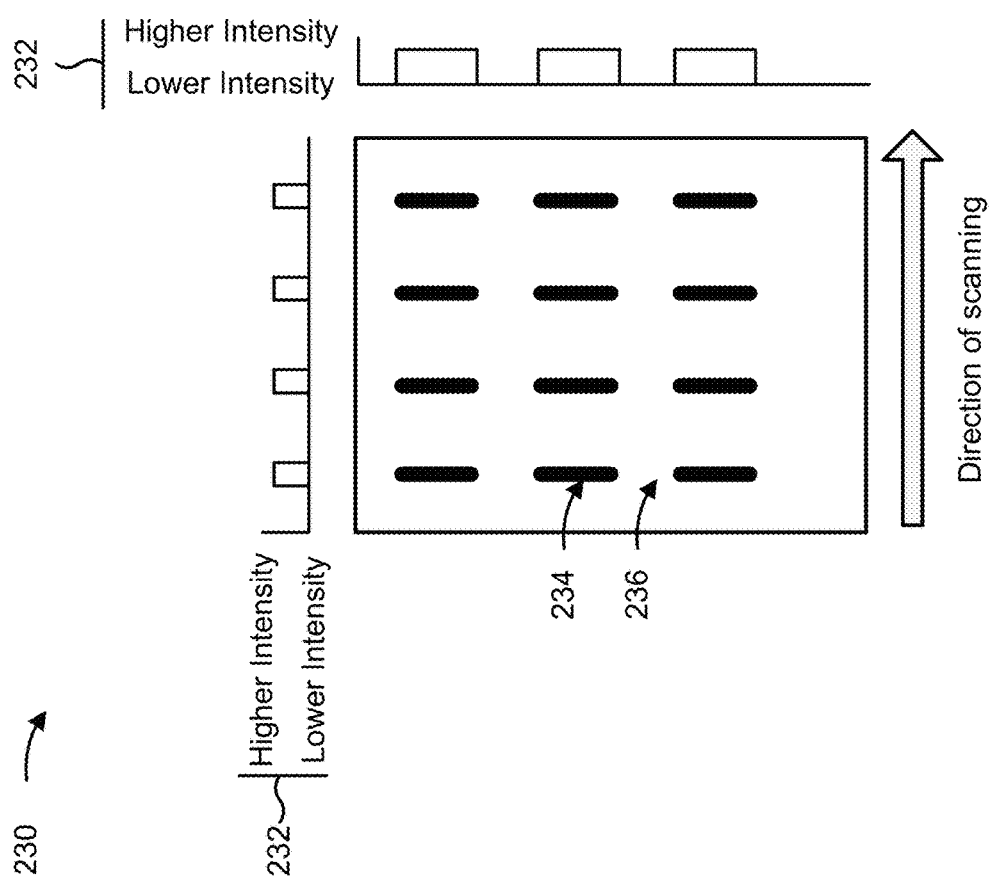

TIME OF FLIGHT-BASED THREE-DIMENSIONAL SENSING SYSTEM

RELATED APPLICATION(S)

This application claims priority to U.S. Provisional Patent Application No. 62/822,603, filed on Mar. 22, 2019, and entitled "TIME OF FLIGHT-BASED THREE-DIMENSIONAL SENSING SYSTEM" and to U.S. Provisional Patent Application No. 62/829,249, filed on Apr. 4, 2019, and entitled "ILLUMINATION MODULE FOR PROJECTING LIGHT INTO PATTERNS WITH AREAS OF HIGH INTENSITY AND AREAS OF INTERMEDIATE INTENSITY," the content of both which is incorporated by reference herein in its entirety.

BACKGROUND

A measurement system may be used for depth-sensing measurements. For example, a lidar system may transmit pulses of laser light, and may measure reflected pulses to determine a distance of an object from the lidar system. In this case, the lidar system may perform a time-of-flight measurement of the laser pulse and may generate a three-dimensional representation of an object. A flash lidar system uses an illumination device and an optical light shaping element that illuminates a scene (a field-of-view of the flash lidar system) in a single pulse. In this case, the flash lidar system may use a time-of-flight measurement on a reflection of the single pulse of a beam to generate a three-dimensional representation of the scene. A scanning (or sweeping) lidar system may use an illumination unit, an optical light shaping element, and a moving mirror or mirrors to move multiple pulses of a laser beam across a scene. For example, the optical light shaping element may cause each pulse of the laser beam to be spread into a line and a moving mirror may sweep the line across a scene over multiple pulses of the laser beam. In this case, the scanning lidar system may use multiple measurements of the reflections from the multiple pulses of the laser beam to generate a three-dimensional representation of a scene.

SUMMARY

According to some possible implementations, a light shaping optic may include a structure, wherein the structure is configured to receive one or more input beams of light with a uniform intensity field and less than a threshold total intensity, and wherein the structure is configured to shape the one or more input beams of light to form one or more output beams of light with a non-uniform intensity field and less than the threshold total intensity.

According to some possible implementations, a system may include an optical transmitter to provide a beam directed toward an object, wherein the beam is associated with a constant intensity across a field of view. The system may include a light shaping optic to concentrate the beam into one or more areas of concentration, wherein the one or more areas of concentration of the field of view are associated with a higher concentration of light than one or more other areas of the field of view. The system may include an optical receiver to receive a reflection of the beam reflected from the object and perform a plurality of time-of-flight measurements on the beam.

According to some possible implementations, an optical device may include a substrate. The optical device may include one or more optical transmitters disposed on the substrate. The optical device may include a light shaping optic disposed in an optical path of the one or more optical transmitters to provide a non-uniform patterned intensity beam toward an object to enable a three-dimensional measurement of the object.

BRIEF DESCRIPTION OF THE DRAWINGS

FIGS. 2A-2G are diagrams of non-uniform intensity fields.

DETAILED DESCRIPTION

Figure 1A:
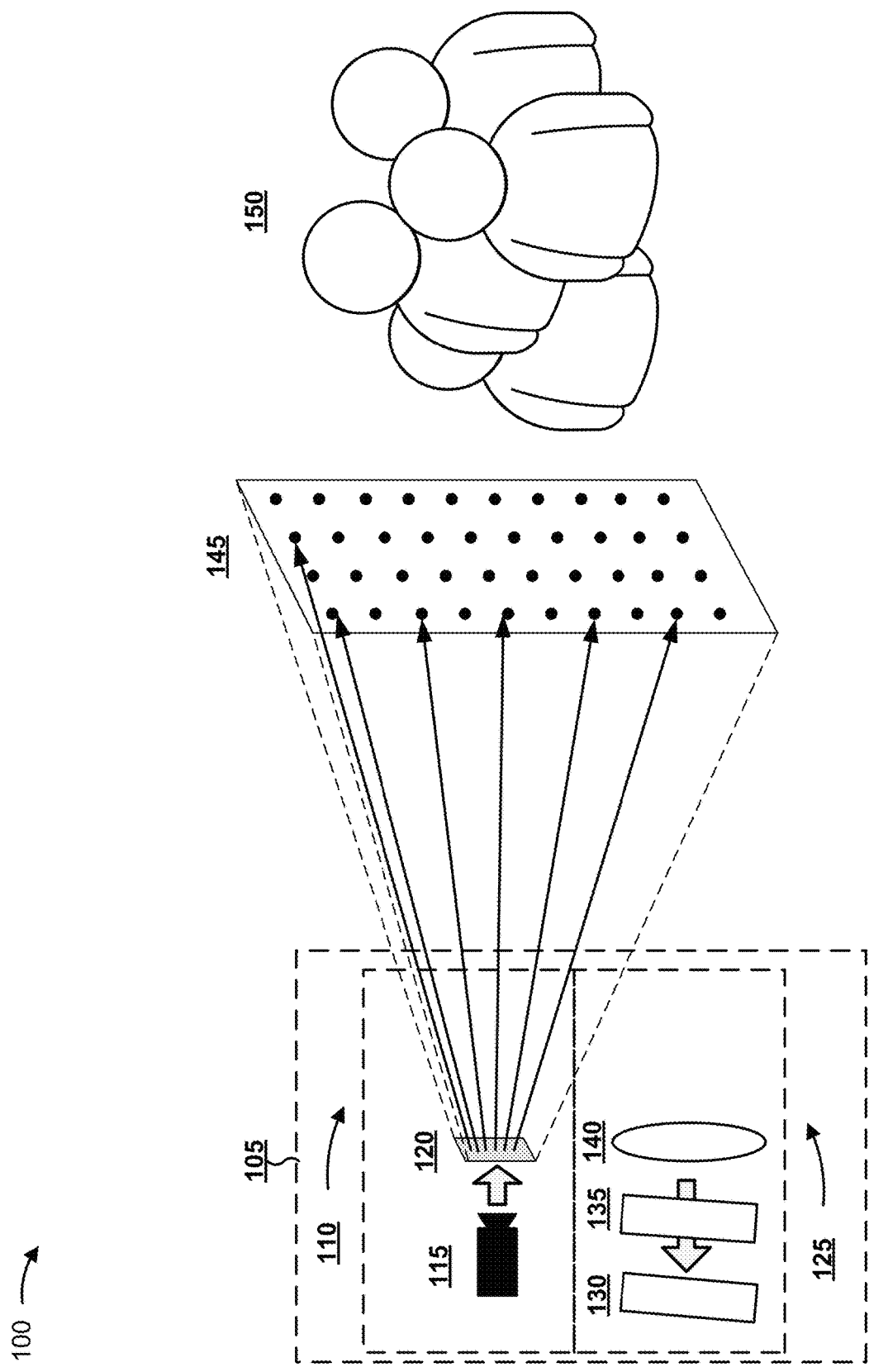
FIGS. 1A and 1B are diagrams of an example implementation described herein.

The following detailed description of example implementations refers to the accompanying drawings. The same reference numbers in different drawings may identify the same or similar elements. The following description uses a lidar system as an example, however, the calibration principles, procedures, and methods described herein may be used with any sensor, including but not limited to other optical sensors.

A three-dimensional imaging system, such as a lidar system, may provide a uniform intensity field to enable imaging of objects in a field-of-view. For example, a flash lidar system may transmit a uniform intensity field of a field of view (i.e., a field-of-view of the flash lidar system) and may perform measurements of a reflection of the uniform intensity field to generate a three-dimensional representation an object. Similarly, a scanning lidar system may provide a set of uniform intensity field scanning lines to sweep across a field of view and may perform measurements of a reflection of the set of uniform intensity field scanning lines to generate a three-dimensional representation of an object.

However, an intensity of light provided by three-dimensional imaging systems may be limited to less than a threshold intensity. For example, compliance with eye safety rating requirements may prevent three-dimensional imaging systems from providing more than a threshold intensity of light. A threshold for eye safety may be based on a power, divergence angel, pulse duration, exposure direction, wavelength, and/or the like. Similarly, power capacity limitations in increasingly miniaturized devices, such as mobile phones, may limit an intensity of light that a three-dimensional imaging system is capable of providing. As a result, at greater than a threshold distance to an object, an amount of light that is reflected back to the three-dimensional imaging system for measurement may be insufficient to enable accurate measurements to be performed. For example, when a lidar system is to determine distances to a group of objects in a field of view, some objects may be within a threshold distance and may be accurately depth-sensed by the lidar system and some other objects may be beyond the threshold distance and the lidar system may receive insufficient reflected light for accurate depth-sensing.

Some implementations described herein may use a non-uniform intensity field to perform three-dimensional imaging. For example, an optical system may include an optical transmitter to provide a uniform intensity field and an optical light shaping element or light shaping optic to shape the uniform intensity field to a non-uniform intensity field. In this case, by using a non-uniform intensity field, the optical system may enable greater than a threshold intensity of light to be directed toward some portions of a field-of-view and less than a threshold amount of light to be directed toward other portions of the field-of-view. For example, the optical system may enable areas of concentration of light to include greater than the threshold intensity of light, which may enable increased range for accurate depth-sensing. In this way, the optical system may enable three-dimensional measurements at greater distances than using a uniform intensity field without exceeding a light intensity threshold across an entire field of view. Moreover, by shaping the non-uniform intensity field with multiple areas of concentration, as described herein, the optical system may enable increased range for depth-sensing and may reduce a loss of resolution associated with concentrating light relative to, for example, a laser ranging system that transmits a single concentrated laser pulse to perform ranging.

Figure 1B:
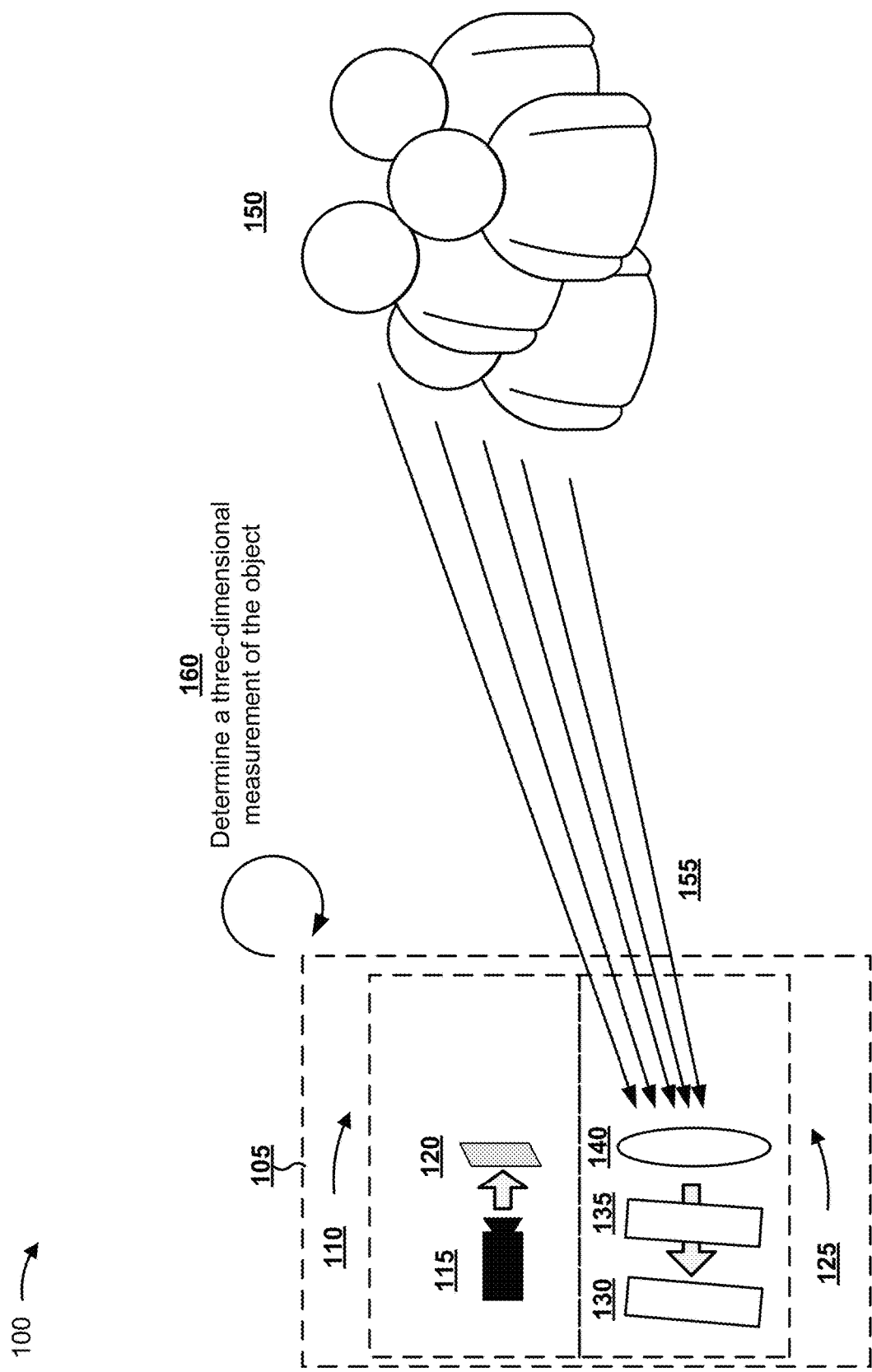

FIGS. 1A and 1B are diagrams of an example implementation 100 described herein. As shown in FIGS. 1A and 1B, example implementation 100 may include a sensor system 105 for performing three-dimensional measurements of objects.

As shown in FIG. 1A, a sensor system 105 may a transmitter system 110, which may include an optical transmitter 115 and a light shaping optic 120, and a receiver system 125, which may include an optical receiver 130 and one or more other optical elements, such as an optical filter 135, a lens 140, and/or the like. In some implementations, sensor system 105 may include a processor to process one or more measurements performed by optical receiver 130. In some implementations, sensor system 105 may include one or more other optical transmitters 115 and/or one or more other optical receivers 130, such as to provide and measure multiple optical beams with different characteristics, such as different types of fields-of-light, as described in more detail herein. In some implementations, sensor system 105 may be implemented in a mobile device, a mobile phone, a security device, a robotics device, a lidar device, an autonomous vehicle system, a gesture recognition system, a proximity sensor system, a counting system, and/or the like.

In some implementations, sensor system 105 may be a distance sensing system. For example, sensor system 105 may be a lidar system (e.g., a flash lidar system, a scanning lidar system, and/or the like), a depth sensor, and/or the like. In some implementations, sensor system 105 may be a three-dimensional imaging system. For example, sensor system 105 may be configured to determine a two-dimensional image of an object and one or more distances associated with the object and/or one or more portions of the object to generate a three-dimensional representation of the object. In this case, sensor system 105 may be configured to combine the two-dimensional image of the object with the distance of the object and/or the one or more portions thereof to generate a three-dimensional representation.

In some implementations, optical transmitter 115 may be a laser, a light emitting diode (LED), and/or the like. For example, optical transmitter 115 may be a laser configured to provide a beam with a uniform intensity field for time-of-flight distance determination. Additionally, or alternatively, optical transmitter 115 may include a vertical cavity surface-emitting laser (VCSEL). In some implementations, optical transmitter 115 may provide multiple beams of light. For example, optical transmitter 115 and light shaping optic 120 may be integrated. In this case, a single substrate may include both one or more optical transmitters 115 and one or more light shaping optics 120.

In some implementations, optical transmitter 115 may be a transmitter of a spectroscopic identification system, an object identification system, an imaging system, a motion tracking system, a biometric system, a security system, and/or the like. In some implementations, optical transmitter 115 may transmit beams associated with a particular spectral range. For example, optical transmitter 115 may transmit light in a visible range, a near-infrared range, a mid-infrared range, a lidar range, and/or the like. Although some implementations are described in terms of a particular set of spectral ranges, other spectral ranges may be possible.

In some implementations, optical receiver 130 may be a sensor array including multiple sensor elements to perform multiple measurements of a reflected beam of light or portions thereof. For example, optical receiver 130 may include multiple sensor elements disposed on a substrate to receive multiple beams of light or multiple portions of a single beam of light.

In some implementations, light shaping optic 120 may be configured to spread or shape a uniform intensity field into a non-uniform intensity field in a particular pattern, as described in more detail herein. In this way, by concentrating photons of a beam of light at particular areas of a scene, a quantity of photons returned to optical receiver 130 at the particular areas of the scene are increased, thereby enabling time-of-flight measurements with a greater degree of accuracy. at greater distances, and/or under more intense ambient light conditions than using a uniform intensity field. In some implementations, the light shaping optic 120 distributes a pattern of dots in a non-uniform density to create the non-uniform intensity field.

In some implementations, the light shaping optic 120 may be a particular type of optical element with a particular structure. For example, light shaping optic 120 may be and/or include an optical diffuser, an optical filter, a collimator, a lens, a mirror, a diffuser (e.g., an engineered diffuser, a holographic diffuser, etc.), another optical element, and/or the like. In some implementations, light shaping optic 120 may be a diffractive optical element (DOE) to diffract light provided by optical transmitter 115 to form a non-uniform intensity field. In some implementations, light shaping optic 120 may be a refractive optical element (ROE) to refract light provided by optical transmitter 115 to form a non-uniform intensity field. In some implementations, light shaping optic 120 may be a set of micro-lenses to shape light provided by optical transmitter 115 to form a non-uniform intensity field. In some implementations, light shaping optic 120 may alter a divergence of a beam to form a non-uniform intensity field.

In some implementations light shaping optic 120 may be an engineered diffuser, which may provide feature sizes (e.g., of approximately 20 micrometers (μm) and with a depth of less than 80 μm) between approximately 100 times and 1000 times larger than may be achieved with a DOE, reduced fabrication errors, and/or the like. Additionally, or alternatively, using an engineered diffuser may provide divergence angle flexibility of between approximately 0.25 degrees and 150 degrees. In some implementations, light shaping optic 120 may be a rectangular-distribution engineered diffuser, a circular-distribution engineered diffuser, and/or any other shape of distribution-type of engineered diffuser. In this case, light shaping optic 120 may be patterned and/or formed on a glass substrate with a thickness of, for example, approximately 0.3 millimeters (mm), between 0.1 mm and 0.01 mm, and/or the like. Additionally, or alternatively, light shaping optic 120 may be imprinted onto a substrate attached to a substrate, and/or the like. Additionally, or alternatively, light shaping optic 120 may be independent of a substrate and may be formed from one or more components of an optical assembly. In some implementations, light shaping optic 120 may have a non-planar shape.

In some implementations, light shaping optic 120 may be optically coupled to multiple optical transmitters 115 to enable creation of a non-uniform intensity field. Additionally, or alternatively, multiple light shaping optics 120 may direct multiple beams or multiple portions of a single beam towards a common area to create the non-uniform intensity field. In some implementations, light shaping optic 120 may include multiple light shaping optics (e.g., multiple different light shaping optics) to shape a single pattern of non-uniform intensity field light, multiple different patterns of non-uniform intensity field light, a uniform intensity field light (e.g., for use in combination with a non-uniform intensity field light), and/or the like. In some implementations, multiple light shaping optics 120 may be optically coupled to multiple optical transmitters 115 to form a single pattern, multiple patterns, and/or the like. Additionally, or alternatively, a single light shaping optic 120 may be optically coupled to a single optical transmitter 115, a single light shaping optic 120 may be optically coupled to multiple optical transmitters 115, multiple light shaping optics 120 may be optically coupled to a single optical transmitter 115, and/or the like.

In some implementations, light shaping optic 120 may be associated with and/or include one or more layers that provide one or more other functionalities. For example, light shaping optic 120 may include and/or be coupled to a bandpass filtering layer, a long pass filtering layer, a short pass filtering layer, an anti-reflectance coating layer, a focusing layer, a optically transmitting conductive layer, and/or the like.

As further shown in FIG. 1A, and by reference number 145, optical transmitter 115 may transmit an input beam toward light shaping optic 120. For example, optical transmitter 115 may transmit the input beam with a uniform intensity field. In this case, the input beam may be associated with less than a threshold intensity, such as less than an eye safety rating threshold (e.g., a power less than a threshold power associated with eye safety ratings, such as a power that is less than the threshold at a given divergence angle, pulse duration, exposure direction, wavelength, and/or the like), less than a power capacity-related threshold, and/or the like. In some cases, the threshold power may relate to a particular category of optical transmitter, such as a power threshold for a category 1 laser, a category 2 laser, a category 3 laser, and/or the like. In some implementations, the threshold intensity may be related to a total intensity of the uniform intensity field. Additionally, or alternatively, the threshold intensity may be related to a net intensity, an average intensity, a maximum intensity, and/or the like of the uniform intensity field. In some implementations, the input beam may be associated with greater than a threshold intensity (e.g., for eye safety). In this case, light shaping optic 120 and/or one or more other optical elements may reduce an intensity of an output beam, as described herein, to have less than the threshold intensity across an entire field of illumination of the output beam. In some implementations, the input beam may have a constant intensity. In some implementations, the input beam may have an intensity that is constant within a threshold portion of the uniform intensity field (e.g., the intensity is constant within a center 95% of the uniform intensity field and tails off at the edges).

As further shown in FIG. 1A, light shaping optic 120 may shape the input beam to form an output beam with a particular pattern directed toward an object 150. For example, light shaping optic 120 may concentrate the input beam, spread the input beam, cause an interference pattern in the input beam, and/or the like. In this way, light shaping optic 120 may direct the output beam with a non-uniform intensity field. For example, light shaping optic 120 may direct, toward object 150, a set of discrete dots of illumination, which may each be a separate output beam (beam portions of the output beam). Additionally, or alternatively, light shaping optic 120 may form an output beam with a set of areas of concentration in a field of view of the output beam where the output beam is associated with a relatively higher intensity of light and another set of areas of the field of view of the output beam where the output beam is associated with a relatively lower intensity of light, as described in more detail herein. In this case, the output beam may be of a form of a single output beam with varying intensity, multiple output beams with varying intensity, multiple output beams with different intensities, and/or the like. Additionally, or alternatively, light shaping optic 120 may form other types and arrangements of areas of concentration, such as a grid arrangement, an interference pattern arrangement, and/or the like, as described in more detail herein.

As shown in FIG. 1B, and by reference number 155, based on the output beam or beams being directed toward object 150, a reflection of the output beam may be directed toward receiver system 125. For example, the reflection of the output beam may be concentrated, filtered, shaped, and/or the like by lens 140 and optical filter 135, and may be received by optical receiver 130. In this case, optical receiver 130 may receive, using a sensor element array, a set of portions of the output beam reflected off object 150. In this case, each portion of the output beam may correspond to an area of concentration of light and optical receiver 130 may use a sensor element to perform a time-of-flight measurement associated with each area of concentration. Additionally, or alternatively, optical receiver 130 may receive multiple reflected beams. For example, when light shaping optic 120 causes multiple discrete output beams to be directed toward object 150, optical receiver 130 may receive reflections of the multiple discrete output beams. In some implementations, optical receiver 130 may be disposed behind lens 140 and the multiple reflections of the multiple output beams may pass through lens 140 and optical filter 135 before being received by an optical sensor. Additionally, or alternatively, lens 140 and optical filter 135 may not be disposed in an optical path between object 150 and optical receiver 130. Although some implementations described herein are described in terms of a free-space optics configuration, other implementations may be possible, such as transmitter system 110, receiver system 125, and/or the like being integrated into a single common substrate.

As further shown in FIG. 1B, and by reference number 160, sensor system 105 may determine one or more three-dimensional measurements of object 150. For example, optical receiver 130 and/or a processor associated therewith may perform one or more time-of-flight measurements of the reflection of the output beam of light and may determine a distance of object 150 and/or one or more portions thereof from sensor system 105. In this case, optical receiver 130 and/or a processor associated therewith may determine a distance of object 150 and/or portions thereof from sensor system 105 based on the one or more time-of-flight measurements and may generate a three-dimensional measurement of object 150 based on the distance of object 150 and/or portions thereof from sensor system 105. In some implementations, sensor system 105 may perform a direct time of flight measurement (e.g., by measuring time), a gated time of flight measurement (e.g., by using a shutter structure, such as electric shutters to open and close a gate), an indirect time of flight measurement (e.g., by measuring phase), and/or the like.

In some implementations, sensor system 105 may generate a depth point cloud of object 150. For example, when sensor system 105 provides a non-uniform intensity field with multiple intensity dots in a dot pattern, as described in more detail herein, sensor system 105 may generate a depth point cloud representing multiple distance measurements for multiple portions of object 150 illuminated by the multiple intensity dots in the dot pattern. In this case, by providing a threshold density of intensity dots in a field of view, sensor system 105 enables a threshold level of resolution to a three-dimensional representation generated of object 150.

In some implementation, sensor system 105 may combine multiple sets of measurements to generate a three-dimensional measurement or a three-dimensional representation of object 150. For example, sensor system 105 may provide another beam with a uniform intensity toward object 150 to perform two-dimensional imaging of object 150 and may combine the two-dimensional imaging with one or more time-of-flight based distance measurements of object 150 to generate a three-dimensional representation of object 150. In this way, sensor system 105 may use a separate beam to enable three-dimensional imaging. Additionally, or alternatively, sensor system 105 may perform two-dimensional imaging using a same beam as for the time-of-flight measurements. For example, sensor system 105 may determine both time-of-flight measurements and imaging measurements on reflections of the output beam to enable three-dimensional imaging of object 150. In this way, sensor system 105 may perform three-dimensional imaging without a separate beam being directed toward object 150, which may reduce a size and/or a cost associated with sensor system 105.

As indicated above, FIGS. 1A and 1B are provided merely as one or more examples. Other examples may differ from what is described with regard to FIGS. 1A and 1B.

FIGS. 2A-2G are diagrams of an example implementations 200-250 of non-uniform intensity fields-of-light that may be shaped by light shaping optic 120.

As shown in FIG. 2A, example implementation 200 shows an example of a non-uniform intensity field. As shown by chart 202, the non-uniform intensity field may include discrete areas 204 of higher intensity light and discrete areas 206 of lower intensity light (e.g., zero intensity light) in a stepwise pattern. In other words, some areas of a field of view are illuminated by an output beam and other areas of the field of view are not illuminated by the output beam. In this case, discrete areas 204 may be areas of concentration of a field of view that are illuminated and discrete areas 206 may be areas of the field of view that are not illuminated. In some cases, each dot shown in FIG. 2A may actually represent multiple dots concentrated into a particular region. For example, a light-shaping optic may concentrate multiple dots into each region of the field of view to concentrate light in each region of the field of view, rather than providing a uniform distribution of dots of light across the field of view.

In this way, the non-uniform intensity field may form a dot pattern (i.e., where each dot represents a beam of light or a portion thereof) to concentrate a beam and non-uniformly illuminate an object with the beam, thereby increasing a distance at which a sensor system 105 may perform depth-sensing measurements relative to a uniform intensity field produced by passing light through a diffuser. In some implementations, discrete areas 204 of higher intensity light may be associated with an intensity that exceeds a threshold and discrete areas 206 of lower intensity light may be associated with an intensity that does not exceed the threshold, such that a total intensity of a beam forming the non-uniform intensity field is less than the threshold. In this way, sensor system 105 may increase a range for depth-sensing without a total intensity of light exceeding the threshold. In another example, sensor system 105 may provide a grid pattern, a striped pattern, and/or the like for the non-uniform intensity field rather than a dot pattern.

Figure 2B:
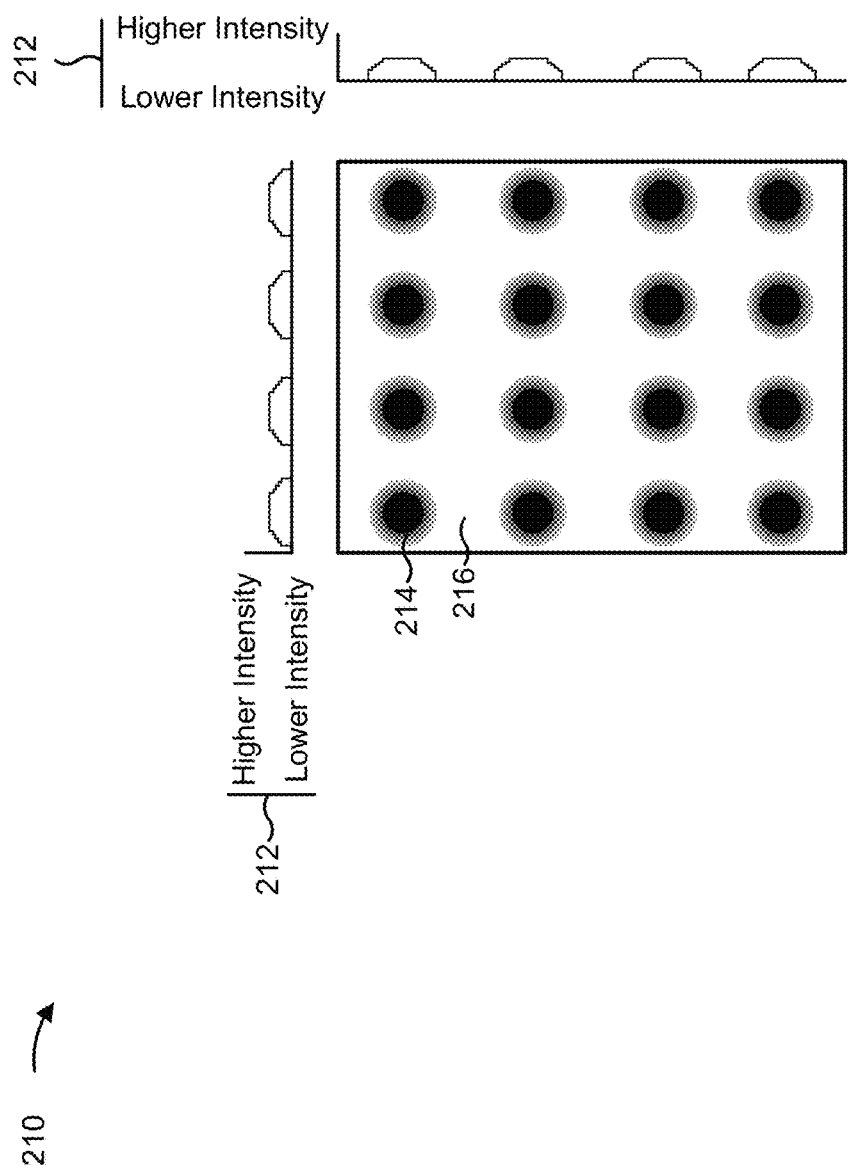

As shown in FIG. 2B, example implementation 210 shows another example of a non-uniform intensity field. As shown by chart 212, the non-uniform intensity field may include discrete areas 214 of higher intensity light and discrete areas 216 of lower intensity light (e.g., zero intensity light) in a stepwise pattern. In another example, the non-uniform intensity field may be a sawtooth pattern rather than a stepwise pattern. In this case, as shown by chart 212, each discrete area 214 may be associated with multiple different intensities of light. In this way, the non-uniform intensity field increases a size of dots of the dot pattern, thereby increasing a resolution of a three-dimensional measurement of an object relative to, for example, a smaller size of dot. In some implementations, in accordance with the cosine law of radiometry, a light-shaping optic may create dots, lines, or pattern where centers of the dots, lines, or patterns are not equal in projected intensity. In some implementations, light at an edge of a field of view may have a higher intensity than patterns in a center to create a uniform intensity at centers of dots for reflected light in accordance with the cosine law of radiometry. For example, a dot at an edge may have a higher center intensity than a dot at a center of the field of view to enable the reflection of the dot at the edge to be balanced with the reflection of the dot at the center. Alternatively, an intensity at another arbitrarily selected location (e.g., an edge, a center, a point between the edge and the center, etc.) may be associated with a higher intensity at a center of a pattern than another arbitrarily selected location.

Figure 2C:
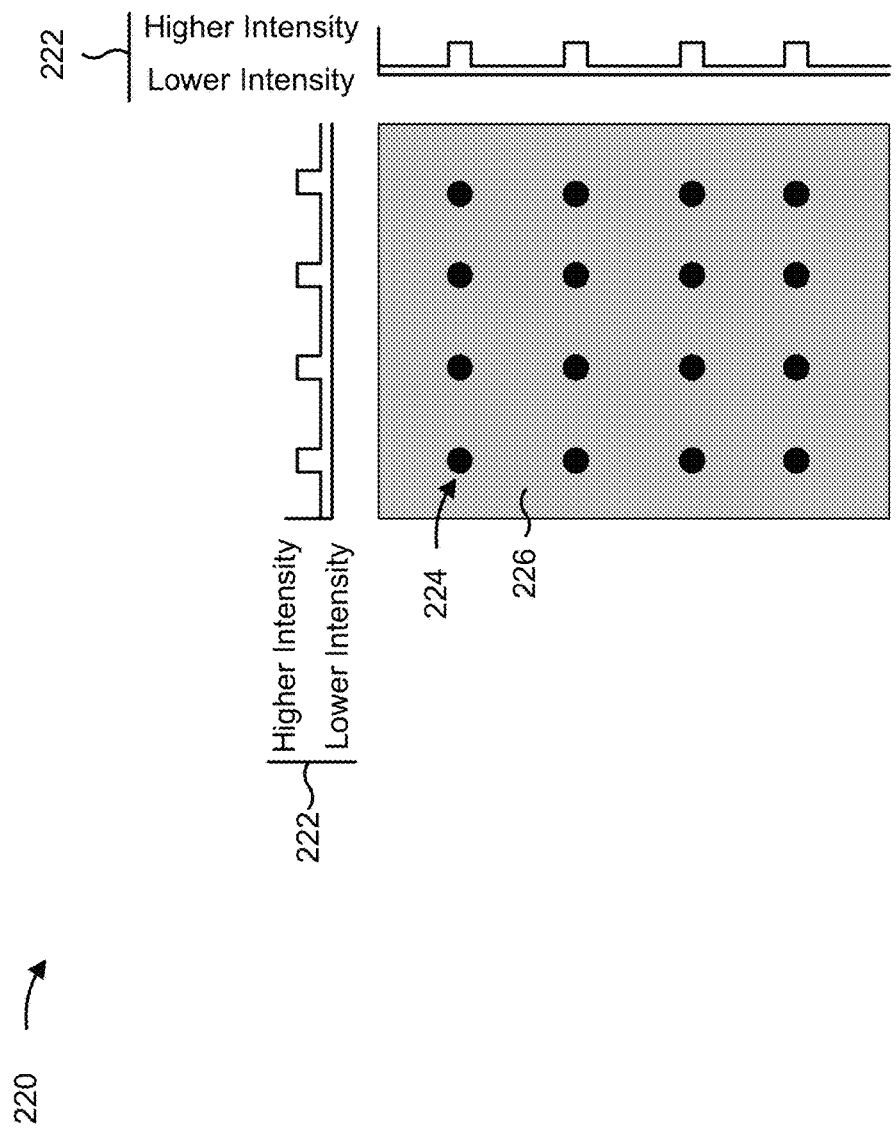

As shown in FIG. 2C, example implementation 220 shows another example of a non-uniform intensity field. As shown by chart 222, the non-uniform intensity field may include discrete areas 224 of higher intensity light and discrete areas 226 of lower intensity light (e.g., non-zero intensity light) in a stepwise pattern. In other words, all areas of a field of view are at least partially illuminated, but some areas are illuminated less than other areas. In this case, discrete areas 224 may be areas of concentration that are illuminated and discrete areas 226 may be areas that are also illuminated but by less light than discrete areas 224. For example, discrete areas 226 may be associated with less than 10% illumination intensity relative to discrete areas 224, thereby enabling discrete areas 226 to return a greater quantity of photons to sensor system 105 at a threshold distance than if a uniform intensity field were used. Additionally, or alternatively, discrete areas 226 may be associated with less than 90% illumination intensity, less than 80% illumination intensity, between 80% and 10% illumination intensity, and/or the like relative to discrete areas 204. In some implementations, sensor system 105 may be able to perform sensing at discrete areas 226. For example, when a non-zero intensity is provided at discrete areas 226 and an object is within a threshold, sensor system 105 may determine a range of the object and/or portions thereof across the field of view. In this way, a sensor system 105 may enable both depth sensing using time-of-flight measurements performed on discrete areas 224 and imaging using measurements performed on discrete areas 226. Moreover, based on providing at least some light across the entire field of view, sensor system 105 enables improved resolution of a three-dimensional measurement of an object relative to, for example, a non-uniform intensity field where portions of a field of view include no light for performing measurements.

As shown in FIG. 2D, example implementation 230 shows another example of a non-uniform intensity field for a scanning type of sensor system 105 (e.g., a scanning lidar system). As shown by chart 232, the non-uniform intensity field may include discrete lines 234 of higher intensity light and gaps 236 of lower intensity light (e.g., zero intensity light) in a stepwise pattern. For example, optical transmitter 115 may provide uniform scanning lines and light shaping optic 120 may shape the uniform scanning lines to non-uniform scanning lines that include discrete lines 234 (i.e., line segments or intensity dots forming a line) and gaps 236. In another example, rather than gaps 236 including zero intensity light, gaps 236 may be partially illuminated with less intensity than discrete lines 234. In this case, sensor system 105 may sweep horizontally across a field-of-view by providing discrete lines 234 to scan a field of view. Additionally, or alternatively, sensor system 105 may provide horizontal discrete lines 234 and gaps 236 and may scan vertically to scan a field of view to perform depth-sensing measurements. In this way, sensor system 105 increases a range for scanning depth-sensing measurements relative to using lower-intensity continuous lines to scan the field of view.

Figure 2E:
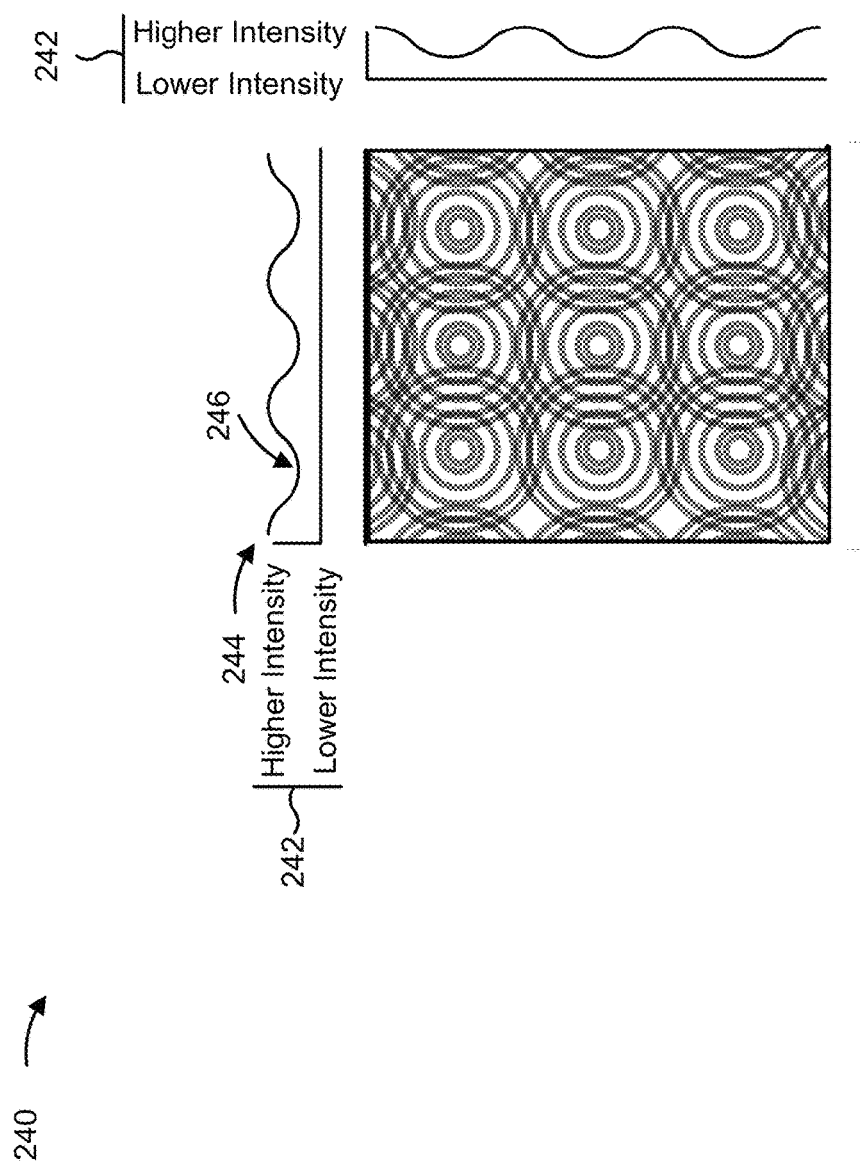

As shown in FIG. 2E, example implementation 240 shows another example of a non-uniform intensity field. As shown by chart 242, the non-uniform intensity field may include a continuous pattern (e.g., a sine-based pattern) of light intensity formed by a ring pattern of light (e.g., which forms an interference pattern of light). In this case, the continuous pattern may include areas of concentration 244 of light that are of higher intensity and areas 246 that are not concentrated and of lower intensity.

Figure 2F:
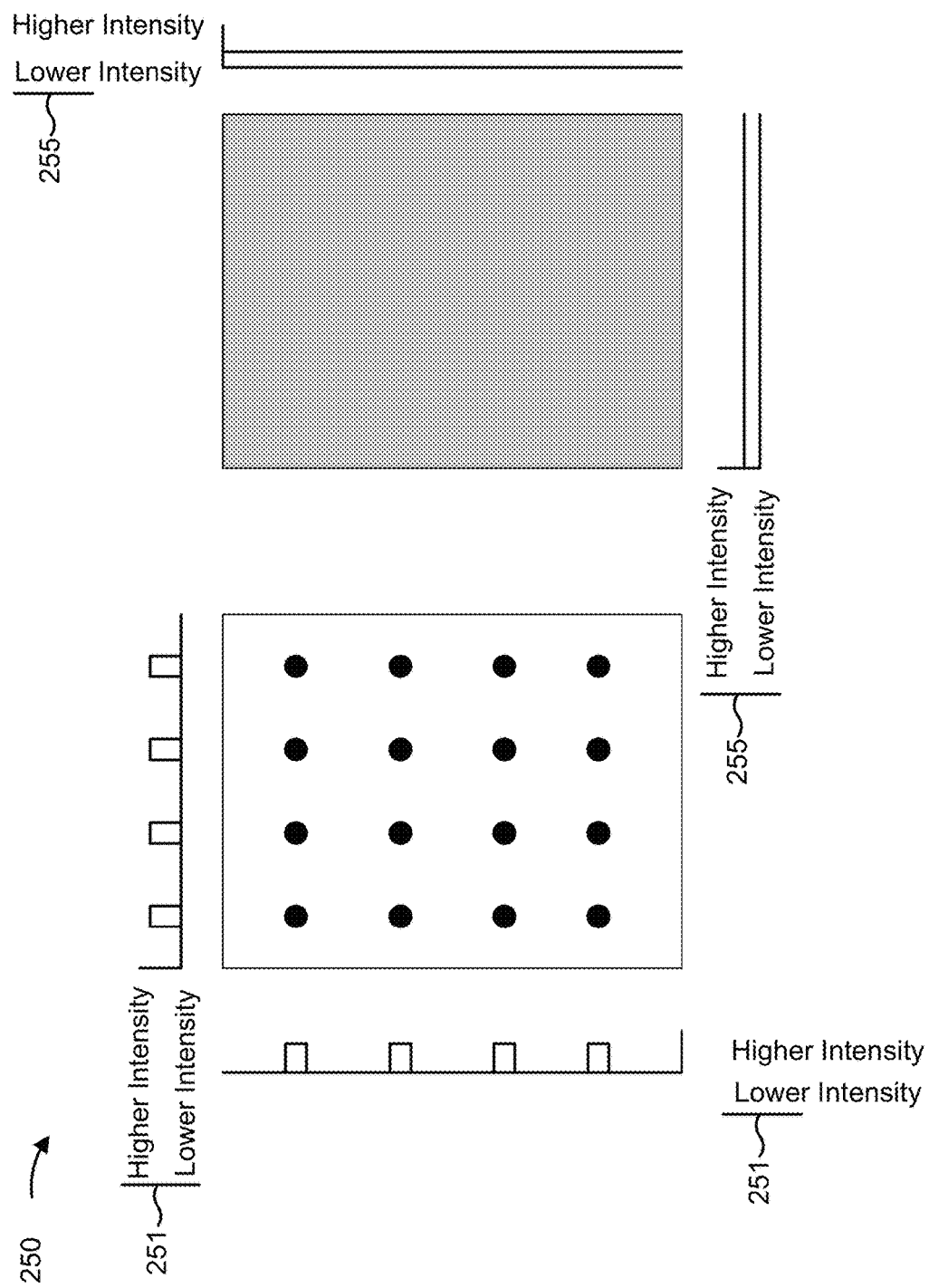

As shown in FIG. 2F, example implementation 250 shows an example of a non-uniform intensity field and a uniform intensity field. As shown by chart 251, the non-uniform intensity field may include discrete areas of higher intensity light and discrete areas of lower intensity light (e.g., zero intensity light) in a stepwise pattern and that may be associated with a total intensity that is less than a threshold (but which may include discrete areas of higher intensity light that exceed the threshold). In contrast, as shown by chart 255, the uniform intensity field may be a constant intensity (e.g., non-zero intensity) field that may be associated with an intensity less than a threshold. In this case, a sensor system 105 may transmit a first beam using the non-uniform intensity field to perform depth sensing and a second beam using the uniform intensity field to perform image sensing. Additionally, or alternatively, sensor system 105 may transmit a single beam, and may include a light shaping optic (e.g., of light shaping optic 120) to split the single beam into a first beam for shaping into the non-uniform intensity field and a second beam for diffusing into the uniform intensity field. In some implementations, sensor system 105 may include multiple VCSEL arrays to provide multiple beams, and the multiple VCSEL arrays may pulse concurrently, sequentially, and/or the like to capture both a depth point cloud and a two-dimensional image using a single image sensor of optical receiver 130. In this way, a sensor system 105 may enable both depth sensing using time-of-flight measurements performed on the non-uniform intensity field and imaging using measurements performed on the uniform intensity field. Although some implementations are described herein in terms of a particular set of patterns, other patterns may be possible and may differ from what is described herein. For example, other patterns may include other repeating patterns of areas of concentration, other non-repeating patterns of areas of concentration, regular patterns of areas of concentration, irregular patterns of areas of concentration, and/or the like. In some implementations, a sensor system 105 may project multiple different patterns (e.g., for separate imaging, for combining to generate a single image, etc.).

Figure 2G:
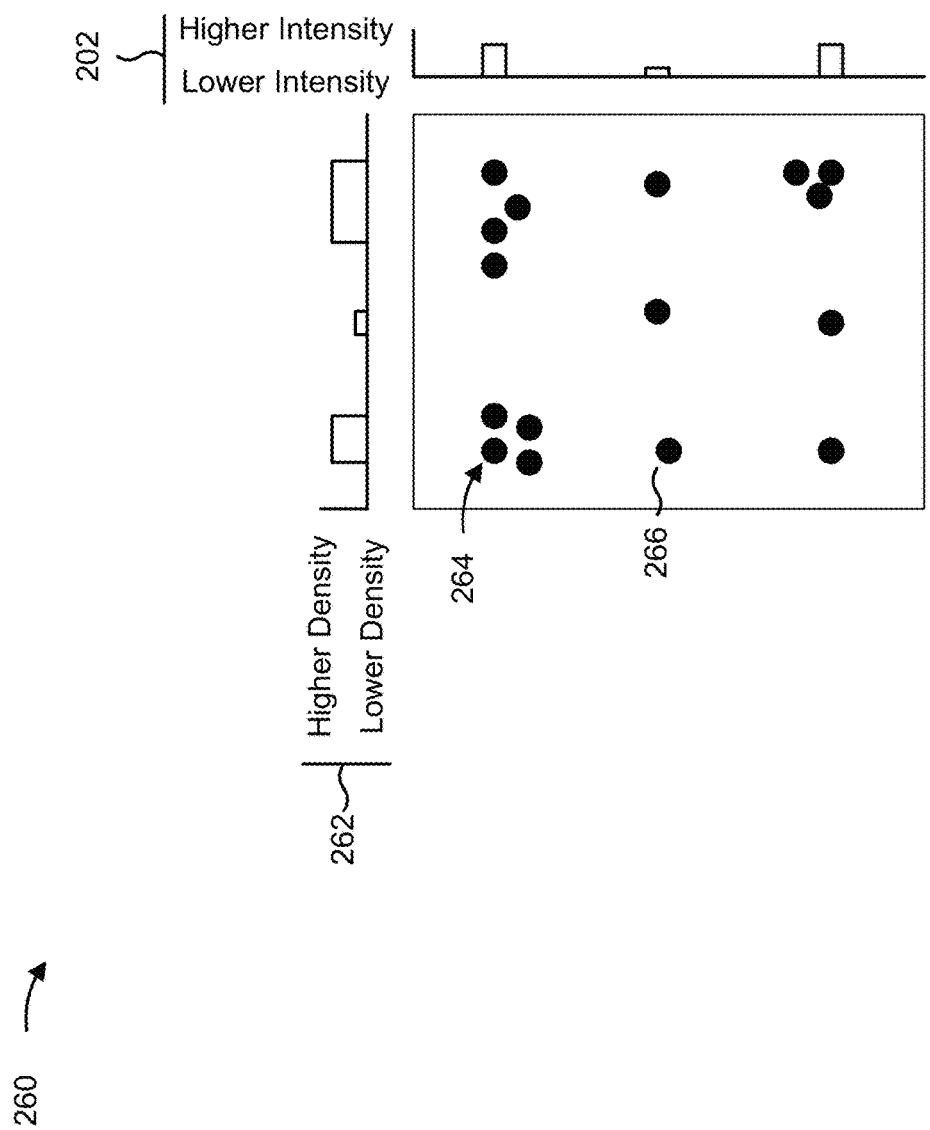

As shown in FIG. 2G, example implementation 260 shows an example of a non-uniform intensity field. As shown by chart 262, the non-uniform intensity field may include discrete areas 264 of higher intensity light based on a higher density of intensity dots being directed to the discrete areas 264 by a light shaping optic relative to areas 266.

As indicated above, FIGS. 2A-2G are provided merely as one or more examples. Other examples may differ from what is described with regard to FIGS. 2A-2G.

Figure 3A:
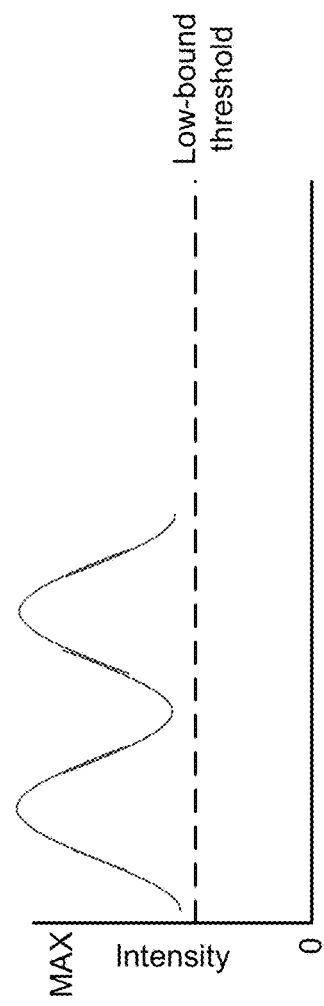
FIGS. 3A-3C are diagrams of non-uniform intensity fields.
Figure 3B:
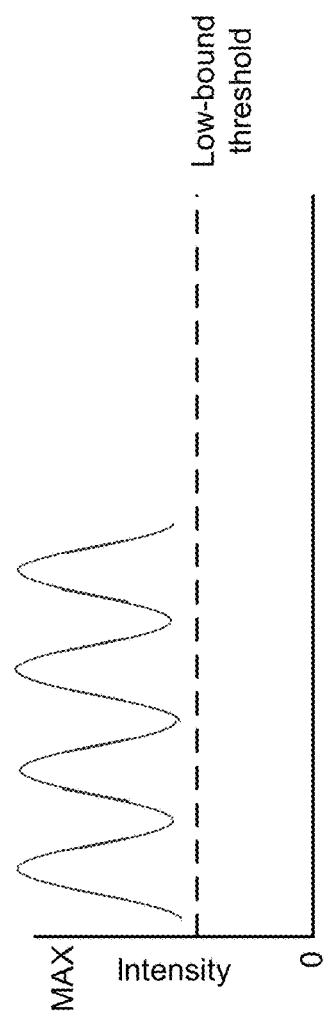
Figure 3C:
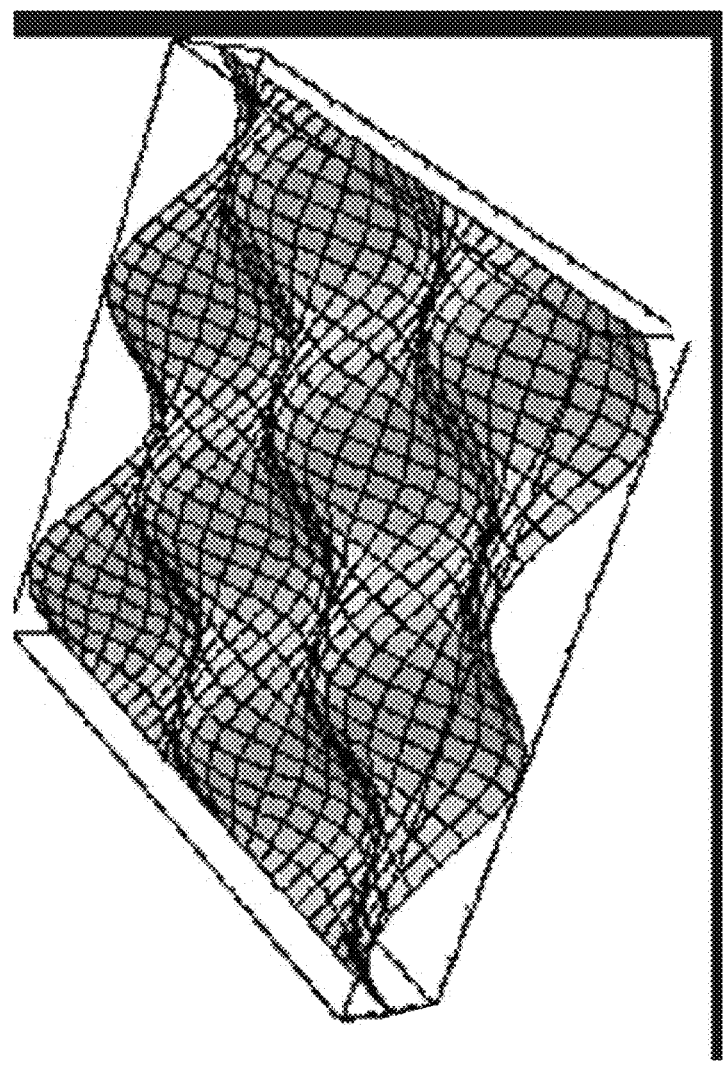

FIGS. 3A-3C are diagrams of an example implementations 300-320 of non-uniform intensity fields-of-light that may be shaped by light shaping optic 120.

As shown in FIG. 3A, and by example implementation 300, some patterns may have the intensity varying from a concentrated light intensity in a first set of areas to lower light intensity in a second set of areas (e.g., that is greater than a threshold light intensity) where the intensity varies as a function, such as a sine function. In this case, the threshold light intensity may be between 10% and 90% of the intensity at points of highest concentration. In contrast, as shown by FIG. 3B, and by example implementation 310, uniform intensity dots with a uniform intensity field between the dots may be used. In contrast, as shown by FIG. 3C, a non-uniform intensity field may be provided in three-dimensions. In another example, a line pattern, a repeating pattern, a non-repeating pattern, multiple different patterns, a combination thereof, and/or the like may be generated with a varying intensity.

As indicated above, FIGS. 3A-3C are provided merely as one or more examples. Other examples may differ from what is described with regard to FIGS. 3A-3C.

In this way, by producing a non-uniform intensity field, sensor system 105 may ensure that a threshold quantity of photons may be received during measurement without increasing a total intensity, thereby enabling accurate depth-sensing at increasing ranges relative to using a uniform intensity field.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A light shaping optic, comprising:
   a structure,
      wherein the structure is configured to receive one or more input beams of light with a uniform intensity field and less than a threshold total intensity;
      wherein the structure is configured to shape the one or more input beams of light to form one or more output beams of light with a non-uniform intensity field and less than the threshold total intensity, and
      wherein the threshold total intensity is a threshold at one or more of a particular divergence angle, a particular pulse duration, or a particular exposure direction.

2. The light shaping optic of claim 1, wherein the non-uniform intensity field comprises a set of areas of higher intensity light and a set of areas of lower intensity light.

3. The light shaping optic of claim 1, wherein the non-uniform intensity field is at least partially illuminated.

4. The light shaping optic of claim 1, wherein at least a portion of the non-uniform intensity field is not illuminated.

5. The light shaping optic of claim 1, wherein the non-uniform intensity field forms a pattern, and
   wherein the pattern is at least one of:
      a dot pattern,
      a grid pattern,
      a ring pattern,
      an interference pattern,
      a stepwise pattern,
      a sawtooth pattern,
      a continuous pattern,
      a sine-based pattern.

6. The light shaping optic of claim 1, wherein the one or more input beams of light are a uniform scanning line for a lidar system and the one or more output beams of light forms a non-uniform scanning line for the lidar system.

7. The light shaping optic of claim 1, wherein the non-uniform intensity field is a grid pattern, a stepwise pattern, or a sawtooth pattern.

8. A system, comprising:
   an optical transmitter to provide a beam directed toward an object, wherein the beam is associated with a constant intensity across a field of view;
   a light shaping optic to concentrate the beam into one or more areas of concentration,
      wherein the one or more areas of concentration of the field of view are associated with a higher concentration of light than one or more other areas of the field of view, and
      wherein a total intensity of the one or more areas of concentration satisfies a threshold at one or more of a particular divergence angle, a particular pulse duration, or a particular exposure direction; and
   an optical receiver to receive a reflection of the beam reflected from the object and perform a plurality of time-of-flight measurements on the beam.

9. The system of claim 8, wherein the light shaping optic is an engineered diffuser.

10. The system of claim 8, wherein the system is configured to illuminate the object using the beam such that the object is non-uniformly illuminated by the one or more areas of concentration.

11. The system of claim 8, wherein the optical receiver is configured to perform a time-of-flight measurement for each area of concentration of the field of view of the one or more areas of concentration of the field of view.

12. The system of claim 8, further comprising:
   a processor configured to generate a depth point cloud of the object using the plurality of time-of-flight measurements.

13. The system of claim 8, wherein the one or more areas of concentration of the field of view form a plurality of intensity dots, and
   wherein the plurality of intensity dots is associated with a threshold density.

14. The system of claim 8, wherein the system is configured to determine the plurality of time-of-flight measurements at greater than a threshold distance of the system relative to the object.

15. The system of claim 8, further comprising:
   a processor to generate a three-dimensional representation of the object based on the plurality of time-of-flight measurements and an imaging measurement of another beam provided by the optical transmitter,
      wherein the other beam is associated with a constant intensity and is directed toward the object without being shaped into one or more areas of concentration.

16. The system of claim 8, wherein the optical receiver is a sensor array including a plurality of sensor elements, and
   wherein each sensor element, of the plurality of sensor elements, is configured to generate a time-of flight measurement of the plurality of time-of-flight measurements.

17. An optical element, comprising:
   a substrate; and
   a light shaping optic to provide a non-uniform patterned intensity beam,
      wherein the non-uniform patterned intensity beam includes a set of first areas with a first intensity and a set of second areas with a second intensity,
      wherein the second intensity is between 10% and 90% of the first intensity, and
      wherein a total intensity of the non-uniform patterned intensity beam is less than a threshold at one or more of a particular divergence angle, a particular pulse duration, or a particular exposure direction.

18. The optical element of claim 17, wherein the optical element is a component of a lidar system.

19. The optical element of claim 17, further comprising:
   a sensor element array disposed on the substrate.

20. The optical element of claim 19, wherein the sensor element array is configured to determine a plurality of time-of-flight measurements of the non- uniform patterned intensity beam to determine a plurality of distances associated with and object.

* * * * *